United States Patent
Iguchi et al.

[11] Patent Number: 6,123,785
[45] Date of Patent: Sep. 26, 2000

[54] PRODUCT AND PROCESS FOR PRODUCING CONSTANT VELOCITY JOINT HAVING IMPROVED COLD WORKABILITY AND STRENGTH

[75] Inventors: Makoto Iguchi; Motohiro Nishikawa, both of Himeji; Masayoshi Saga, Mohka, all of Japan

[73] Assignees: Sanyo Special Steel Co., Ltd., Shikama-Ku; Honda Motor Co., Ltd., Tokyo-To, both of Japan

[21] Appl. No.: 09/418,577

[22] Filed: Oct. 15, 1999

[51] Int. Cl.[7] ............................ C22C 38/32; C22C 38/50; C21D 8/00
[52] U.S. Cl. .......................... 148/330; 148/334; 148/906; 148/572; 148/649; 148/654
[58] Field of Search ..................... 148/906, 330, 148/334, 572, 618, 649, 654

[56] References Cited

U.S. PATENT DOCUMENTS

| | | | |
|---|---|---|---|
| 5,542,991 | 8/1996 | Muraoka et al. | 148/330 |
| 5,545,267 | 8/1996 | Ochi et al. | 148/335 |
| 5,725,690 | 3/1998 | Ochi et al. | 148/906 |

FOREIGN PATENT DOCUMENTS 1171630   3/1999   Japan .

*Primary Examiner*—Deborah Yee
*Attorney, Agent, or Firm*—Birch, Stewart, Kolasch & Birch, LLP.

[57] ABSTRACT

The process for producing a constant velocity joint having improved cold workability, rolling fatigue life, and torsional strength comprises the steps of: rolling or forging an alloy at a heating temperature of $Ac_3$ to 1000° C. with a reduction in area of not less than 30%, said alloy comprising by weight carbon: 0.52 to 0.60%, silicon: 0.03 to 0.15%, manganese: 0.10 to 0.40%, chromium: 0.05 to 0.30%, molybdenum: 0.10 to 0.30%, sulfur: 0.003 to 0.020%, boron: 0.0005 to 0.005%, titanium: 0.02 to 0.05%, nitrogen: not more than 0.01%, aluminum: 0.005 to 0.05%, and manganese+ chromium+molybdenum: 0.35 to 0.80% with the balance consisting of iron and unavoidable impurities; spheroidizing the rolled or forged alloy in such a manner that, after heating to $Ac_1$ to 770° C., slow cooling is performed from 730° C. to 700° C. at a rate of not more than 15° C./hr, thereby producing a steel product having a hardness of 68 to 78 HRB after spheroidizing; and induction hardening the steel product to obtain a constant velocity joint having a surface hardness of not less than 60 HRC.

2 Claims, 2 Drawing Sheets

PRODUCT AND PROCESS FOR PRODUCING CONSTANT VELOCITY JOINT HAVING IMPROVED COLD WORKABILITY AND STRENGTH

TECHNICAL FIELD OF THE INVENTION

The present invention relates to a process for producing a constant velocity joint, as a boron-containing automobile component, having improved cold workability, induction hardenability, rolling fatigue life, and torsional strength.

BACKGROUND OF THE INVENTION

Steels corresponding to S48C (JIS (Japanese Industrial Standards)) and S53C (JIS) or steels having improved cold forgeability described in Japanese Patent Publication No. 38847/1989 have hitherto been induction hardened and then used for outer races of constant velocity joints in automobiles. However, a reduction in weight of components is necessary in order to reduce the production cost and to improve the fuel consumption. To this end, the development of constant velocity joints having improved rolling fatigue life properties and torsional strength properties without sacrificing the cold workability of the above steels has been desired in the art.

Accordingly, it is an object of the present invention to provide a constant velocity joint for automobiles and the like, comprising a steel having improved rolling fatigue life properties and torsional strength properties without sacrificing cold workability, such as cold forgeability or machinability, of steels corresponding to S48C (JIS) and S53C (JIS) or steels having improved cold forgeability described in Japanese Patent Publication No. 38847/1989.

DISCLOSURE OF THE INVENTION

The present inventors have found that the addition of molybdenum in combination with an increase in carbon content is effective for improving the rolling fatigue life and torsional strength properties. They have further found proper ranges of the amounts of these elements added in consideration of the cold workability. Further, in order to further improve the cold workability, rolling conditions and spheroidizing conditions have been optimized. Thus, the object of the present invention has been attained.

Specifically, according to one aspect of the present invention, there is provided a process for producing a constant velocity joint having improved cold workability, rolling fatigue life properties, and torsional strength properties, comprising the steps of:

rolling or forging an alloy at a heating temperature of $Ac_3$ to 1000° C. with a reduction in area of not less than 30%, said alloy comprising by weight carbon: 0.52 to 0.60%, silicon: 0.03 to 0.15%, manganese: 0.10 to 0.40%, chromium: 0.05 to 0.30%, molybdenum: 0.10 to 0.30%, sulfur: 0.003 to 0.020%, boron: 0.0005 to 0.005%, titanium: 0.02 to 0.05%, nitrogen: not more than 0.01%, aluminum: 0.005 to 0.05%, and manganese+chromium+molybdenum: 0.35 to 0.80% with the balance consisting of iron and unavoidable impurities;

spheroidizing the rolled or forged alloy in such a manner that, after heating to $Ac_1$ to 770° C., slow cooling is performed from 730° C. to 700° C. at a rate of not more than 15° C./hr, thereby producing a steel product having a hardness of 68 to 78 HRB after spheroidizing; and induction hardening the steel product to obtain a constant velocity joint having a surface hardness of not less than 60 HRC.

Thus, the optimization of the amounts of carbon and molybdenum added and the optimization of the production process have realized the provision of a process for producing a constant velocity joint having improved cold workability, rolling fatigue life properties, and torsional strength properties.

BRIEF DESCRIPTION OF THE DRAWINGS

FIGS. 1A and 1B are partially broken and partially omitted views showing the shape of a constant velocity joint used in a rolling fatigue life test and a torsional strength test, wherein FIG. 1A is a plan view and FIG. 1B a front view.

DETAILED DESCRIPTION OF THE INVENTION

Figure 1A:
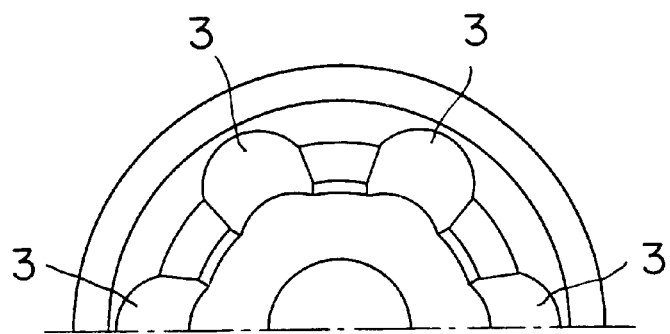

The reasons for the limitation of additive elements in the steel products according to the present invention will be described.

Carbon: Carbon is an element which is necessary for ensuring strength, as components for machine structural use, after quenching and tempering and, in addition, for improving the rolling fatigue life properties and torsional strength properties. When the content of carbon is less than 0.52%, a surface hardness requirement at the time of induction hardening, a surface hardness of not less than 60 HRC, cannot be satisfied. This results in unsatisfactory strength. On the other hand, a carbon content exceeding 0.60% lowers the cold workability and, in addition, causes cracking at the time of induction hardening. For this reason, the carbon content is limited to 0.52 to 0.60%.

Silicon: Silicon is an element which is necessary for deoxidation. When the content of silicon is less than 0.03%, the contemplated effect is unsatisfactory, while when the silicon content exceeds 0.15%, the workability is lowered. Therefore, the silicon content is limited to 0.03 to 0.15%.

Manganese: Manganese is an element necessary for ensuring the hardenability. When the content of manganese is less than 0.10%, the contemplated effect is unsatisfactory, while when the silicon content exceeds 0.40%, the workability is lowered. Therefore, the manganese content is limited to 0.10 to 0.40%.

Chromium: Chromium is an element which contributes to hardening. When the content of chromium is less than 0.05%, the contemplated effect cannot be attained. On the other hand, when the chromium content exceeds 0.30%, chromium is enriched in carbides at the time of spheroidizing. In this case, the carbides are left in the induction hardening. This makes it impossible to obtain even hardness after the induction hardening. For this reason, the chromium content is limited to 0.05 to 0.30%.

Molybdenum: Molybdenum is an element which functions to improve the hardenability and, at the same time, to improve the rolling fatigue life and torsional strength. When the content of molybdenum is less than 0.10%, the contemplated effect is unsatisfactory. On the other hand, a molybdenum content exceeding 0.30% increases the hardness after spheroidizing and significantly deteriorates the workability. For this reason, the molybdenum content is limited to 0.10 to 0.30%.

Sulfur: Sulfur is an element which is converted to MnS and TiS functioning to improve the machinability. When the content of sulfur is less than 0.003%, the contemplated effect is unsatisfactory. On the other hand, when the sulfur content exceeds 0.020%, the cold workability is deteriorated. Thus the sulfur content is limited to 0.003 to 0.020%.

Boron: Boron is an element which functions to improve the intergranular strength and, at the same time, to improve the hardenability. When the content of boron is less than 0.0005%, the contemplated effect is unsatisfactory, while a boron content exceeding 0.005% deteriorates the hardenability. For this reason, the boron content is limited to 0.0005 to 0.005%.

Titanium: Titanium is an element which fixes free nitrogen contained in the steel to improve the hardenability improvement effect of boron. When the content of titanium is less than 0.02%, the contemplated effect is unsatisfactory. On the other hand, when the titanium content exceeds 0.05%, the effect is saturated because the content of nitrogen in the steel is limited to not more than 0.01%. Therefore, the titanium content is limited to 0.02 to 0.05%.

Nitrogen: Nitrogen, when it is present in an amount exceeding 0.01%, leads to an increased amount of TiN which adversely affects the fatigue properties. Thus, the nitrogen content is limited to not more than 0.01%.

Aluminum: Aluminum is an element which is necessary as a deoxidizer. When the content of aluminum is less than 0.005%, the contemplated effect is unsatisfactory. On the other hand, an aluminum content exceeding 0.05% results in an increased amount of alumina oxides and deteriorates fatigue properties and workability. For this reason, the aluminum content is limited to 0.005 to 0.05%.

Manganese+chromium+molybdenum: All of manganese, chromium, and molybdenum are elements which contribute to the induction hardenability and, at the same time, function to increase the hardness of the steel product. When the total content of manganese, chromium, and molybdenum is not more than 0.35%, an even hardened microstructure cannot be obtained, leading to significantly shortened rolling fatigue life. On the other hand, when this total content is not less than 0.80%, the hardness requirement after spheroidizing, a hardness of not more than 78 HRB, cannot be satisfied. For this reason, the total content of manganese, chromium, and molybdenum is limited to 0.35 to 0.80%.

Rolling/forging conditions: At the time of rolling or forging, the alloy as a starting material is heated to $Ac_3$ or above in order to provide homogeneous austenitization without leaving carbides and ferrites. When ferrites are left after austenitization, an even microstructure of ferrite grain size cannot be obtained in the microstructure after rolling or forging. In this case, heat-treatment-induced distorsion after quenching and tempering is large. On the other hand, when the heating temperature is above 1000° C., fine precipitates are grown to a relatively large size. This results in increased size of austenite grains at the time of rolling or forging, reduces the ferrite content after rolling or forging, and deteriorates the workability. In addition, the grain size after quenching and tempering is increased, resulting in lowered intergranular strength. Therefore, the heating temperature at the time of rolling or forging is limited to $Ac_3$ to 1000° C. Regarding the reduction in area, a reduction in area of less than 30% reduces the amount of ferrites produced and deteriorates the workability. Spheroidizing conditions:

Heating Temperature

In order to obtain a good spheroidized microstructure, heating to a two phase region of austenite and spheroidized residual carbides is necessary. When the heating temperature is below $Ac_1$, the carbides are not divided into pieces. In this case, lamellar pearlite is left after spheroidizing, making it impossible to obtain a good spheroidized microstructure. On the other hand, heating to a temperature above 770° C. causes no residual carbides, and, in this case, lamellar pearlite precipitates in the course of cooling. For this reason, the heating temperature is limited to $Ac_1$ to 770° C.

Temperature Region for Slow Cooling

In order to obtain a good spheroidized microstructure, slow cooling should be carried out in the temperature region, where carbides precipitate, to inhibit the precipitation of lamellar pearlite and to grow the residual carbides. At a temperature above 730° C., carbides do not substantially precipitate. The precipitation is completed at 700° C. Therefore, the temperature region for slow cooling is limited to 730 to 700° C. The cooling rate of the region other than the region for slow cooling, that is, the temperature region from the above heating temperature to 730° C. and the temperature region from 700° C. to room temperature, is not limited and may be any rate. In these regions, however, the highest possible cooling rate is preferred from the viewpoint of industrial productivity.

Slow Cooling Rate

Cooling in the temperature region from 730 to 700° C. at a rate of more than 15° C./hr causes the precipitation of lamellar pearlite during cooling. This makes it impossible to obtain a good spheroidized microstructure. For this reason, the slow cooling rate is limited to not more than 15° C./hr.

Hardness: When the hardness after spheroidizing exceeds 78 HRB, cracking occurs at the time of cold forging. Further, in this case, the service life of dies is significantly shortened, leading to an adverse effect on the productivity. On the other hand, when the hardness after spheroidizing is less than 68 HRB, the machinability is deteriorated. For this reason, the hardness after spheroidizing is limited to 68 to 78 HRB.

Hardness after induction hardening: When the hardness after induction hardening is less than 60 HRC, the rolling fatigue life is shortened. Further, in this case, since sliding is applied to the rolling portion, the abrasion loss of components is increased. For this reason, the hardness after induction hardening is limited to not less than 60 HRC.

EXAMPLES

Preferred embodiments of the present invention will be described with reference to the following examples and comparative examples. The chemical compositions of steels in the examples and comparative examples are shown in Nos. 1 to 9 of Table 1. Steel Nos. 1 to 3 of the invention respectively have the same chemical compositions as steels of S53C, S55C, and S58C specified in JIS, except that the content of silicon and the content of manganese have been lowered and molybdenum and boron have been added. On the other hand, comparative steel Nos. 4, 5, and 6 are respectively steels of S48C, S53C, and S58C. Comparative steel Nos. 7 and 8 have the same chemical compositions as steels of S48C and S53C, except that the content of silicon and the content of manganese have been lowered and boron has been added. Comparative steel No. 9 has the same chemical composition as a steel of S58C, except that the content of silicon and the content of manganese have been lowered and molybdenum and boron have been added with manganese+chromium+molybdenum being 0.85%. That is, comparative steel No. 9 does not satisfy a requirement of 0.35≦manganese+chromium+molybdenum≦0.80%.

Figure 1B:
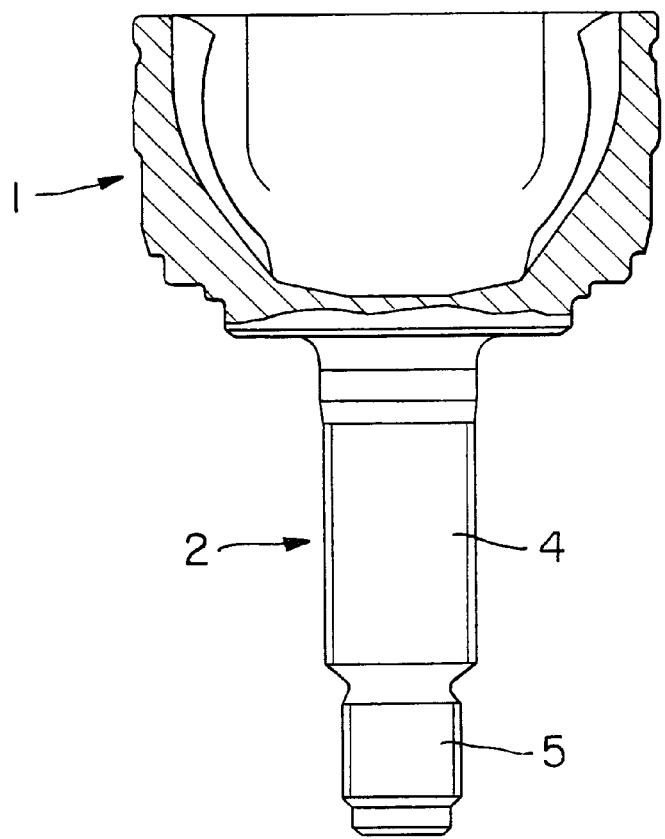

100 kg of each of the test steels (steel Nos. 1 to 3 of the invention and comparative steel Nos. 4 to 10) having chemical compositions shown in Table 1 was produced by the melt process in a vacuum melting furnace. These steels were heated to 950° C., hot forged into φ55, and then spheroidized in such a manner that, after heating to 750° C., slow cooling was carried out from 730° C. to 700° C. at a cooling rate of 10° C./hr. Thus, steel products were obtained. They were then worked into a size of φ52 mm×111 mm in length. Thereafter, material section working was carried out by cold forging, followed by turning and form rolling to obtain outer races for constant velocity joints, having a shape shown in FIG. 1. In the drawing, the constant velocity joint comprises a mouse 1 and a shaft 2. The shaft 2 comprises a serration 4 and a thread 5. Six ball rolling grooves 3 are provided inside the mouse 1 in the outer race of the constant velocity joint. A retainer 8 for holding the ball 7 is provided on the top and bottom of the ball rolling groove 3. Further, an inner race 6 for the constant velocity joint is mounted within the outer race of the constant velocity joint. Induction quenching and tempering (tempering conditions: at 180° C. for one hr) was carried out so as to provide an effective hardening depth (a distance from the surface to a point of 500 HV) of about 3.0 mm on rolling surface of the mouse in the outer race of the constant velocity joint and an effective hardening depth of about 5 mm on the shaft 2.

TABLE 1

(mass %)

| No. | C | Si | Mn | P | S | Cr | Mo | B | Ti | Al | N | O |
|---|---|---|---|---|---|---|---|---|---|---|---|---|
| Steel of inv. | | | | | | | | | | | | |
| 1 | 0.53 | 0.11 | 0.28 | 0.011 | 0.010 | 0.13 | 0.25 | 0.0014 | 0.038 | 0.027 | 0.0068 | 0.0006 |
| 2 | 0.56 | 0.06 | 0.25 | 0.013 | 0.008 | 0.16 | 0.20 | 0.0017 | 0.035 | 0.026 | 0.0042 | 0.0007 |
| 3 | 0.59 | 0.09 | 0.34 | 0.009 | 0.012 | 0.14 | 0.15 | 0.0016 | 0.039 | 0.023 | 0.0052 | 0.0005 |
| Comp. steel | | | | | | | | | | | | |
| 4 | 0.48 | 6.27 | 6.84 | 0.011 | 0.011 | 0.010 | 0.01 | — | — | 0.026 | 0.0134 | 0.0007 |
| 5 | 0.53 | 0.29 | 0.86 | 0.013 | 0.009 | 0.017 | 0.01 | — | — | 0.022 | 0.0117 | 0.0008 |
| 6 | 0.57 | 0.24 | 0.83 | 0.014 | 0.010 | 0.015 | 0.01 | — | — | 0.024 | 0.0122 | 0.0007 |
| 7 | 0.49 | 0.09 | 0.27 | 0.009 | 0.008 | 0.014 | 0.01 | 0.0015 | 0.034 | 0.025 | 0.0057 | 0.0008 |
| 8 | 0.53 | 0.08 | 0.31 | 0.012 | 0.013 | 0.016 | 0.01 | 6.0013 | 0.037 | 0.023 | 0.0058 | 0.0009 |
| 9 | 0.58 | 0.08 | 0.40 | 0.015 | 0.010 | 0.20 | 0.25 | 0.0016 | 0.041 | 0.024 | 0.0064 | 0.0009 |

Figure 2:
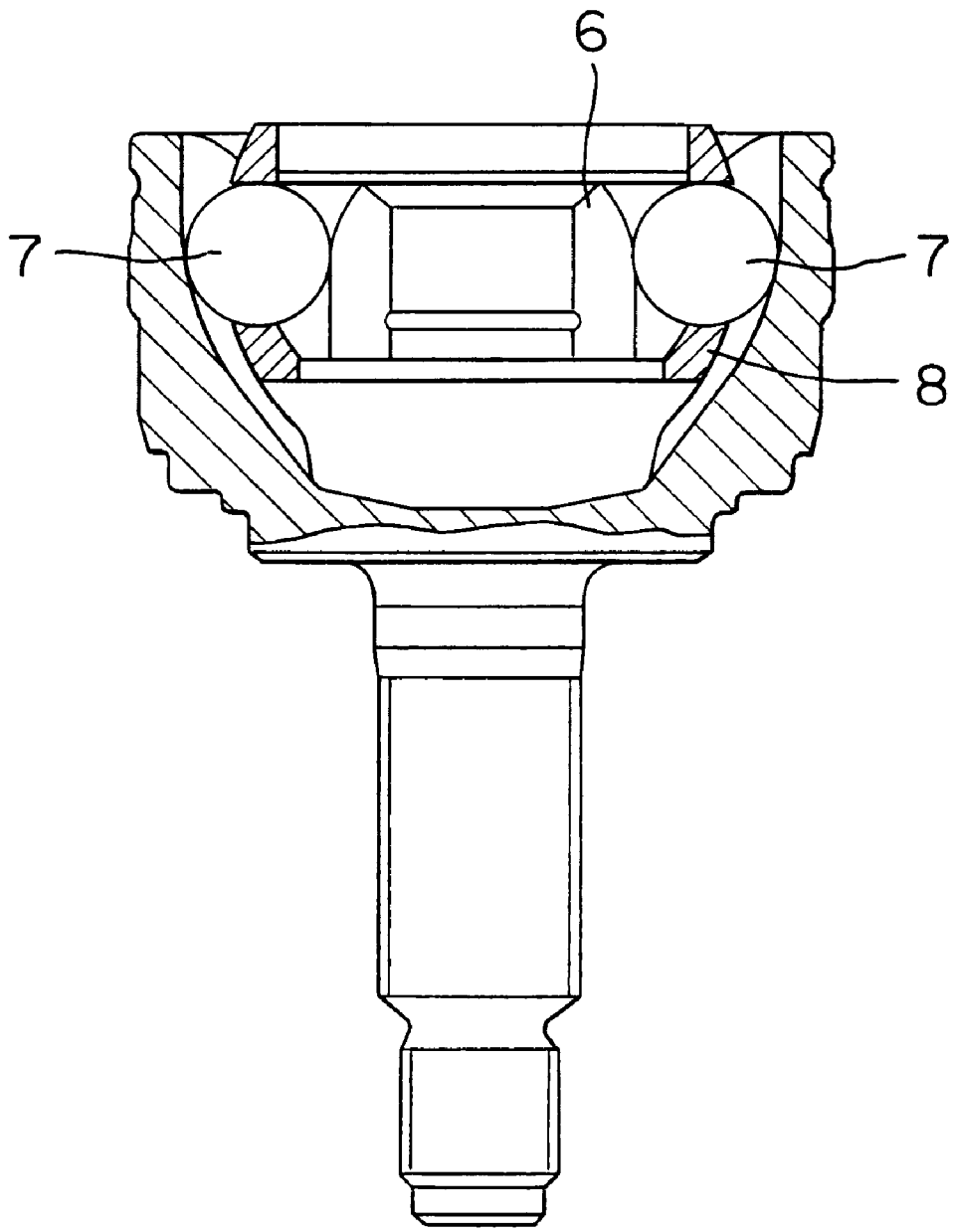
FIG. 2 is a diagram showing a constant velocity joint assembly of inner and outer races and balls used in a rolling fatigue test.

For the products thus obtained, the following tests were carried out. Testing methods and the results will be described. For the mouse rolling surface, the rolling fatigue life test was carried out, and, for the shaft 2, the torsional strength test was carried out. In the rolling fatigue life test, as shown in FIG. 2, evaluation was made by conducting the test using a combination of the outer race with the inner race 6 and balls 7 in the constant velocity joint. On the other hand, in the torsional strength test, evaluation was made by torsion in such a state that the mouse 1 and the serration 4 were secured. For the hardening depth, the hardness was measured with a Vickers hardness meter to determine a position of 500 HV. The hardness of the material after spheroidizing was measured with a Rockwell hardness meter.

Hardness of Material and Results of Rolling Fatigue Life Test

Test pieces having an effective hardening depth after induction quenching and tempering of about 3.0 mm were tested for rolling fatigue life. This test was carried out with a given pressure applied for 100 hr to determine the pressure necessary for causing pitting of even one of the six ball rolling grooves 3. The higher the pressure necessary for causing the pitting, the better the rolling fatigue life. Steel Nos. 1 to 3 of the invention, as compared with comparative steel Nos. 4 to 8 having a carbon content on the same level as that of steel Nos. 1 to 3, had higher pressure necessary for causing the pitting, indicating that steel Nos. 1 to 3 had superior rolling fatigue life properties. Further, unlike comparative steel Nos. 4, 5, 6, and 9, steel Nos. 1 to 3 of the invention, by virtue of 0.35≦manganese+chromium+molybdenum≦0.80% and the optimization of spheroidizing conditions, had a hardness after spheroidizing of 68 to 78 HRB, could inhibit cracking at the time of cold forging, and could improve the service life of dies.

TABLE 2

| No. | Hardness after sheroidizing, HRB | Surface hardness, HRC | Effective hardening depth, mm | pressure necessary for causing pitting, kgf/mm$^2$ |
|---|---|---|---|---|
| Steel of inv. | | | | |
| 1 | 72 | 61 | 3.2 | 235 |
| 2 | 73 | 62 | 3.1 | 239 |
| 3 | 76 | 64 | 3.0 | 245 |
| Comp. steel | | | | |
| 4 | 82 | 57 | 2.8 | 177 |
| 5 | 85 | 60 | 2.9 | 209 |
| 6 | 89 | 62 | 3.0 | 218 |
| 7 | 68 | 57 | 3.1 | 174 |
| 8 | 71 | 59 | 3.0 | 207 |
| 9 | 81 | 64 | 3.3 | 254 |

Results of Torsional Strength Test

Test pieces having an effective hardening depth after induction quenching and tempering of about 5.0 mm were tested for torsional strength on the shaft 2. Steel Nos. 1 to 3 of the invention, by virtue of the addition of boron and molybdenum in combination to enhance the intergranular strength, had torsional strength superior to comparative steel Nos. 4 to 8. As compared with the steels of the invention, comparative steel No. 9 had the same level of strength, but were inferior in cold workability.

TABLE 3

| No. | Effective hardening depth, mm | Breaking strength, kgf/mm$^2$ |
|---|---|---|
| Steel of inv. | | |
| 1 | 5.2 | 185 |
| 2 | 5.1 | 190 |
| 3 | 5.0 | 192 |
| Comp. steel | | |
| 4 | 4.9 | 143 |
| 5 | 5.3 | 155 |
| 6 | 5.1 | 161 |
| 7 | 5.0 | 168 |
| 8 | 5.2 | 172 |
| 9 | 5.3 | 199 |

As is apparent from the foregoing description, the process for producing a constant velocity joint according to the present invention has the following effects.

1) Bringing the carbon content to 0.52 to 0.60% and the addition of 0.10 to 0.30% of molybdenum in the chemical composition of the steel and brining the hardness after induction quenching and tempering to not less than 60 HRC can realize the production of constant velocity joints having improved rolling fatigue life and torsional strength.

2) Further, bringing the total content of manganese+chromium+molybdenum to 0.35 to 0.80% in the chemical composition of the steel and the optimization of rolling or forging conditions and spheroidizing conditions can realize the production of constant velocity joints having improved cold workability.

Thus, according to the process of the present invention, constant velocity joints having improved rolling fatigue properties and strength properties can be produced without sacrificing cold workability, such as cold forgeability and machinability. This contributes to a reduction in weight of automobile components and the like.

What is claimed is:

1. A process for producing a constant velocity joint having improved cold workability, rolling fatigue life, and torsional strength, comprising the steps of:

rolling or forging an alloy as a starting material at a heating temperature of Ac$_3$ to 1000° C. with a reduction in area of not less than 30%, said alloy comprising by weight carbon: 0.52 to 0.60%, silicon: 0.03 to 0.15%, manganese: 0.10 to 0.40%, chromium: 0.05 to 0.30%, molybdenum: 0.10 to 0.30%, sulfur: 0.003 to 0.020%, boron: 0.0005 to 0.005%, titanium: 0.02 to 0.05%, nitrogen: not more than 0.01%, aluminum: 0.005 to 0.05%, and manganese+chromium+molybdenum: 0.35 to 0.80% with the balance consisting of iron and unavoidable impurities;

spheroidizing the rolled or forged alloy in such a manner that, after heating to Ac$_1$ to 770° C., slow cooling is performed from 730° C. to 700° C. at a rate of not more than 15° C./hr, thereby producing a steel product having a hardness of 68 to 78 HRB after the spheroidizing; and induction hardening the steel product to obtain a constant velocity joint having a surface hardness of not less than 60 HRC.

2. A constant velocity joint produced by the process according to claim 1.

* * * * *